(12) United States Patent
Anderson et al.

(10) Patent No.: US 8,747,025 B2
(45) Date of Patent: Jun. 10, 2014

(54) OFFSHORE CABLE LAYING METHOD

(71) Applicant: J. Ray McDermott, S.A., Houston, TX (US)

(72) Inventors: Thom Charles Anderson, New Braunfels, TX (US); Colin James Fraser, Aberdeen (GB)

(73) Assignee: J. Ray McDermott, S.A., Houston, TX (US)

(*) Notice: Subject to any disclaimer, the term of this patent is extended or adjusted under 35 U.S.C. 154(b) by 101 days.

(21) Appl. No.: 13/676,327

(22) Filed: Nov. 14, 2012

(65) Prior Publication Data

US 2014/0133919 A1   May 15, 2014

(51) Int. Cl.
*F16L 1/12*   (2006.01)

(52) U.S. Cl.
USPC ........................................ 405/166; 405/168.3

(58) Field of Classification Search
USPC ............................. 405/158, 166, 168.1, 168.3
See application file for complete search history.

(56) References Cited

U.S. PATENT DOCUMENTS

| | | | | |
|---|---|---|---|---|
| 3,630,461 A | * | 12/1971 | Sugasti et al. | 405/168.3 |
| 3,680,342 A | * | 8/1972 | Mott et al. | 405/168.3 |
| 4,117,692 A | * | 10/1978 | Oberg | 405/168.3 |
| 4,260,288 A | * | 4/1981 | Ellers et al. | 405/168.3 |
| 5,080,530 A | * | 1/1992 | Crawford et al. | 405/163 |
| 6,540,440 B1 | * | 4/2003 | Beaujean | 405/168.3 |
| 2007/0258772 A1 | * | 11/2007 | Bursaux et al. | 405/168.3 |
| 2010/0034591 A1 | * | 2/2010 | Wilson | 405/168.3 |

FOREIGN PATENT DOCUMENTS

GB    2244321 A    * 11/1991    ............... F16L 1/12

* cited by examiner

*Primary Examiner* — Frederick L Lagman
(74) *Attorney, Agent, or Firm* — D. Neil LaHaye

(57) ABSTRACT

A method for laying cable from a vessel at a near shore location in shallow water to shore. The cable on the vessel is wrapped around a modified roller quadrant on the vessel. The roller quadrant is moved from the vessel into the water. A pulling device is attached by a line to the roller quadrant. The pulling device is used to pull the roller quadrant and cable toward shore. The pulling device may be positioned in the water and moved to shore as required. The pulling device may also be initially positioned on shore. The roller quadrant may include a skid and buoyancy modules to reduce the pulling force required to move the roller quadrant and lay the cable to shore.

8 Claims, 6 Drawing Sheets

OFFSHORE CABLE LAYING METHOD

FIELD AND BACKGROUND OF INVENTION

The invention is generally related to laying cable from a vessel and more particularly to laying cable to or from shore.

Traditionally, the standard methodology for laying a subsea cable to or from shore would be by either of the following two methods.

In the first method, a cable lay vessel (CLV) loaded with the full length of cable sets up at a distance from the shore ready to pay out the cable end. A winch wire from shore is connected to the cable end and begins pulling the cable towards the shore. Floatation buoys are attached at intervals as the cable is progressively paid out towards the shore. This method has significant limitations (especially with relatively large diameter, heavy cables), including effects of weather, currents, and lack of water depth for the buoyancy to be effective. This method also requires the mother ship to come relatively close in to the shore (usually, about one kilometer, maximum distance from shore) and imposes significant limitations of the selection of a suitable cable landfall site with sufficient water depth for the CLV.

The second method provides an alternative, which is to install a conduit from shore under the seabed using directional drilling with the conduit exiting the seabed at a suitable distance and water depth offshore. This may be appropriate where the seabed topography of the shore approach is not conducive to the integrity of the cable and long term service life or possibly for other restrictions such as environmental considerations. The conduit exit point is at a location where the CLV can set up to receive the end of a pre-installed winch wire to be connected to the cable end. The cable is then paid out from the CLV and pulled through the conduit by the shore winch. As with the first method above, this restricts selection of a suitable landfall site to where the CLV can approach to within one to two kilometers from shore (dictated by the maximum distance it would be feasible to pull a cable through the conduit).

The problem of proximity to shore for the CLV is overcome by transferring a portion of the cable from the CLV to a shallow water barge which would then lay cable towards the shore. However, when the barge can proceed no further, the cable must then be transferred to the final tie-in point onshore. Traditionally, this would be performed by floating in a large loop (bight) until the free end is available and can be connected to a shore winch wire. The floating loop is then pulled in until it can be positioned along the planned cable route. This method shares the same limitations as in the first method above, such as weather and cross currents due to the cable being in a large loop.

SUMMARY OF INVENTION

The present invention addresses the shortcomings in the prior art by enabling the cable to be pulled in a controlled manner from the point where the barge is grounded and cannot lay any further. This is accomplished by using a semi-circular roller quadrant from the cable lay barge or vessel. The semi-circular roller quadrant is modified to allow removal from the deck of the barge or vessel and has buoyancy tanks or foam and/or skids added. The semi-circular roller quadrant, having cable around it, is removed from the vessel deck and placed in the water. The roller quadrant is then pulled toward shore while the cable is paid out from the barge or vessel and laid from the roller quadrant.

The various features of novelty which characterize the invention are pointed out with particularity in the claims annexed to and forming part of this disclosure. For a better understanding of the present invention, and the operating advantages attained by its use, reference is made to the accompanying drawings and descriptive matter, forming a part of this disclosure, in which a preferred embodiment of the invention is illustrated.

BRIEF DESCRIPTION OF THE DRAWINGS

In the accompanying drawings, forming a part of this specification, and in which reference numerals shown in the drawings designate like or corresponding parts throughout the same.

DESCRIPTION OF THE PREFERRED EMBODIMENTS

Figure 1:
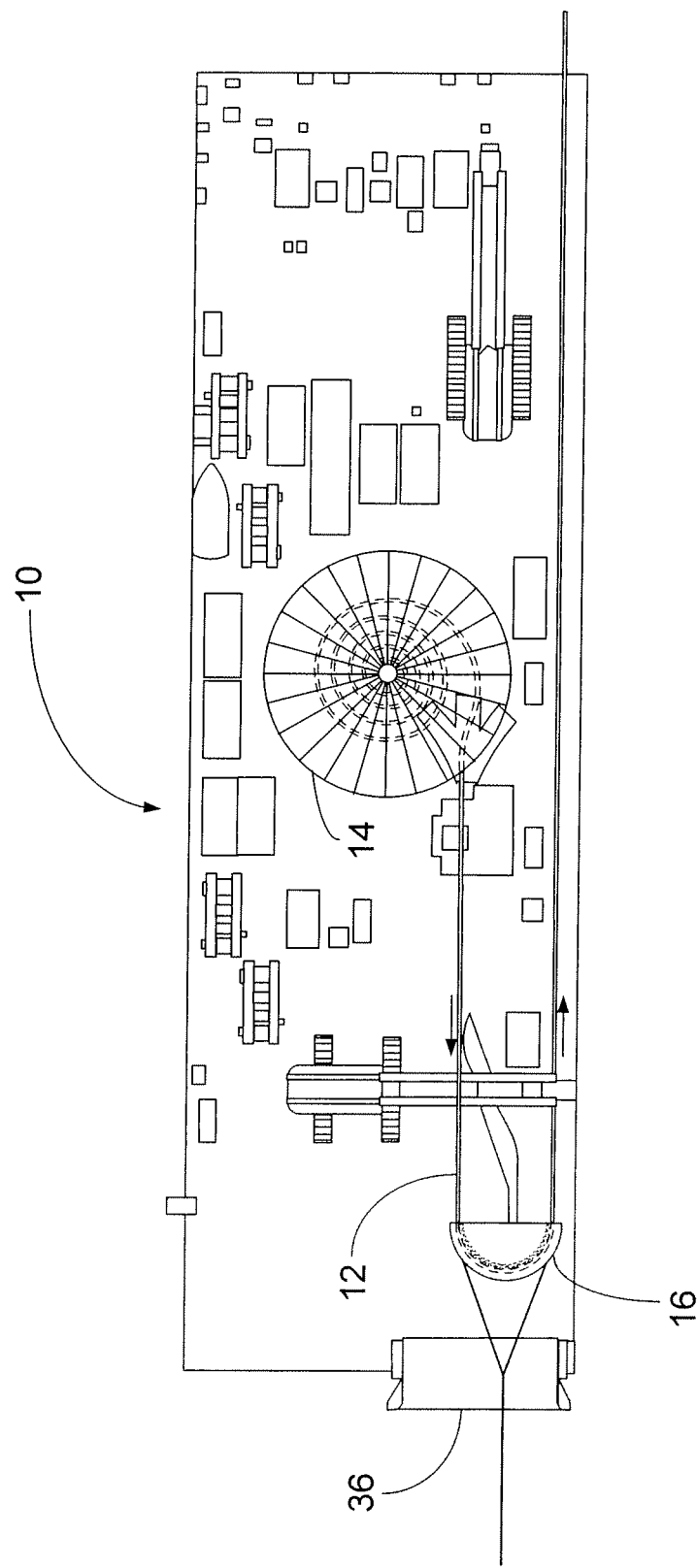
FIG. 1 is a plan view of a cable lay barge.

FIG. 1 is a plan view of a cable lay barge 10 that has been moved as close as possible to shore while laying cable. The barge 10 has reached the shallowest water depth possible and the remainder of the cable 12 to be laid and brought on shore is preferably in the carousel 14 on the barge 10.

It should be understood that the term "cable" as it is used herein is intended to mean any flexible pipe or cable-like product that is coiled in a carousel, basket or on a reel and required to be laid along a route between an offshore location and on-shore location. This can typically be any of all of the following:

flexible pipe or flowline for conveying fluids;

umbilical containing multiple cores for conveying different services including power, hydraulic, chemical and fiber optic transmissions;

composite cable for power transmission and other services including fiber optic communication lines.

Figure 2:
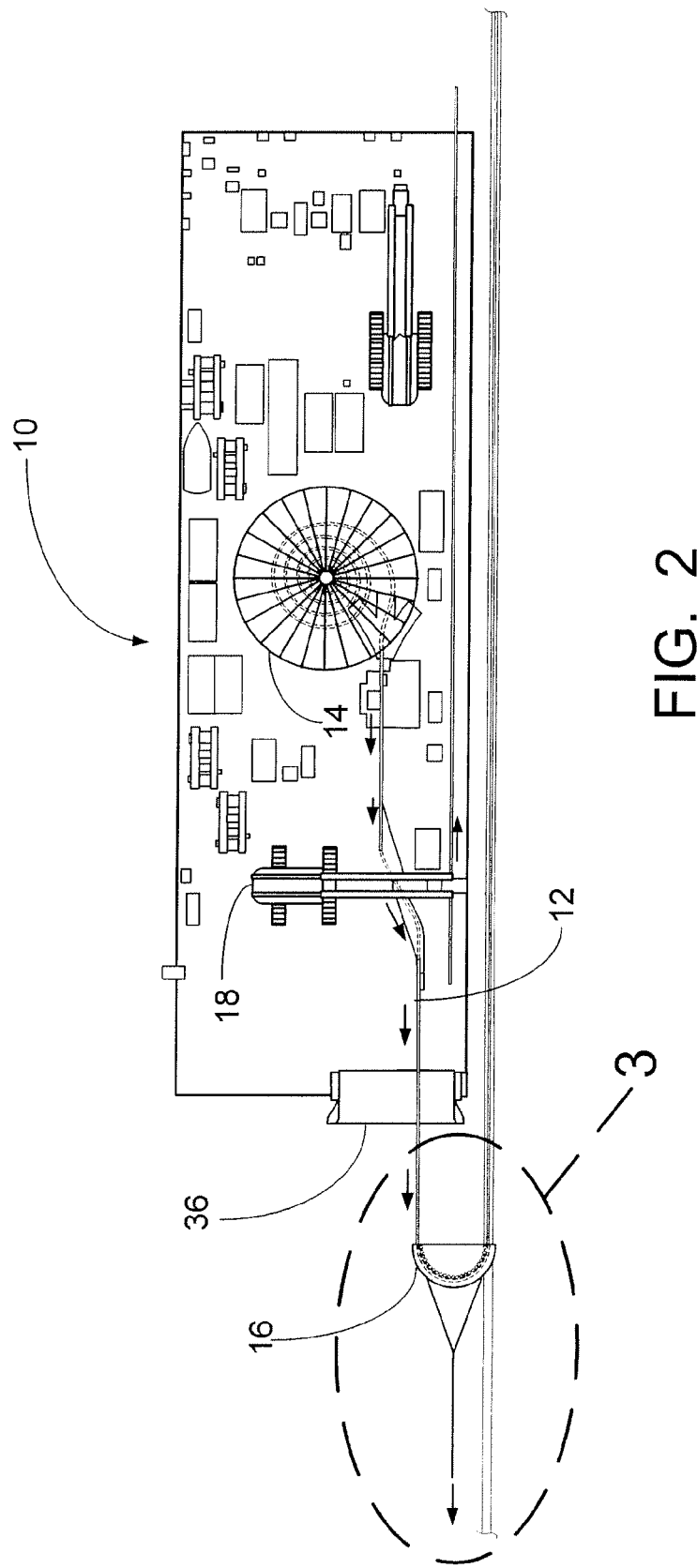
FIG. 2 is a plan view of the cable lay barge with the roller quadrant placed in the water.

As seen in FIG. 2, the roller quadrant 16 has been lifted from the deck of the barge 10 and placed in the water by the use of a crawler crane 18 on the barge 10. The roller quadrant 16 is a semi-circular roller quadrant which, in the prior art, has been rigidly mounted on the deck of the barge 10 and used strictly on the deck of the barge 10. The roller quadrant 16 may be used during spooling of the cable 12 from a larger vessel not shown onto the carousel 14 on the barge 10. The carousel may also be referred to as a reel. As seen in the enlarged view of FIGS. 3 and 6, the roller quadrant 16 is semi-circular in shape and provided with a plurality of rollers 20. The semi-circular shape and rollers 20 provide for easier movement of the cable 12 and avoid over-bending and friction stresses that could damage the cable 12. As known in the industry, the rollers 20 preferably include both horizontally and vertically oriented rollers. The horizontally oriented rollers take the weight of the cable and the vertically oriented rollers resist bending of the cable.

As seen in FIG. 2-5, unlike the prior art, the roller quadrant 16 of the invention is designed to be removable from the barge 10 and placed in the water for laying cable. The roller quadrant 16 has a skid 22 attached to its lower portion and may also have buoyancy modules 24 attached thereto. The skid 22 and buoyancy modules 24 reduce the forces required to move the roller quadrant 16 along the soil bottom 26 of the water body.

The buoyancy modules 24 are optional and used when required due to water depth and/or soil conditions.

Figure 6:
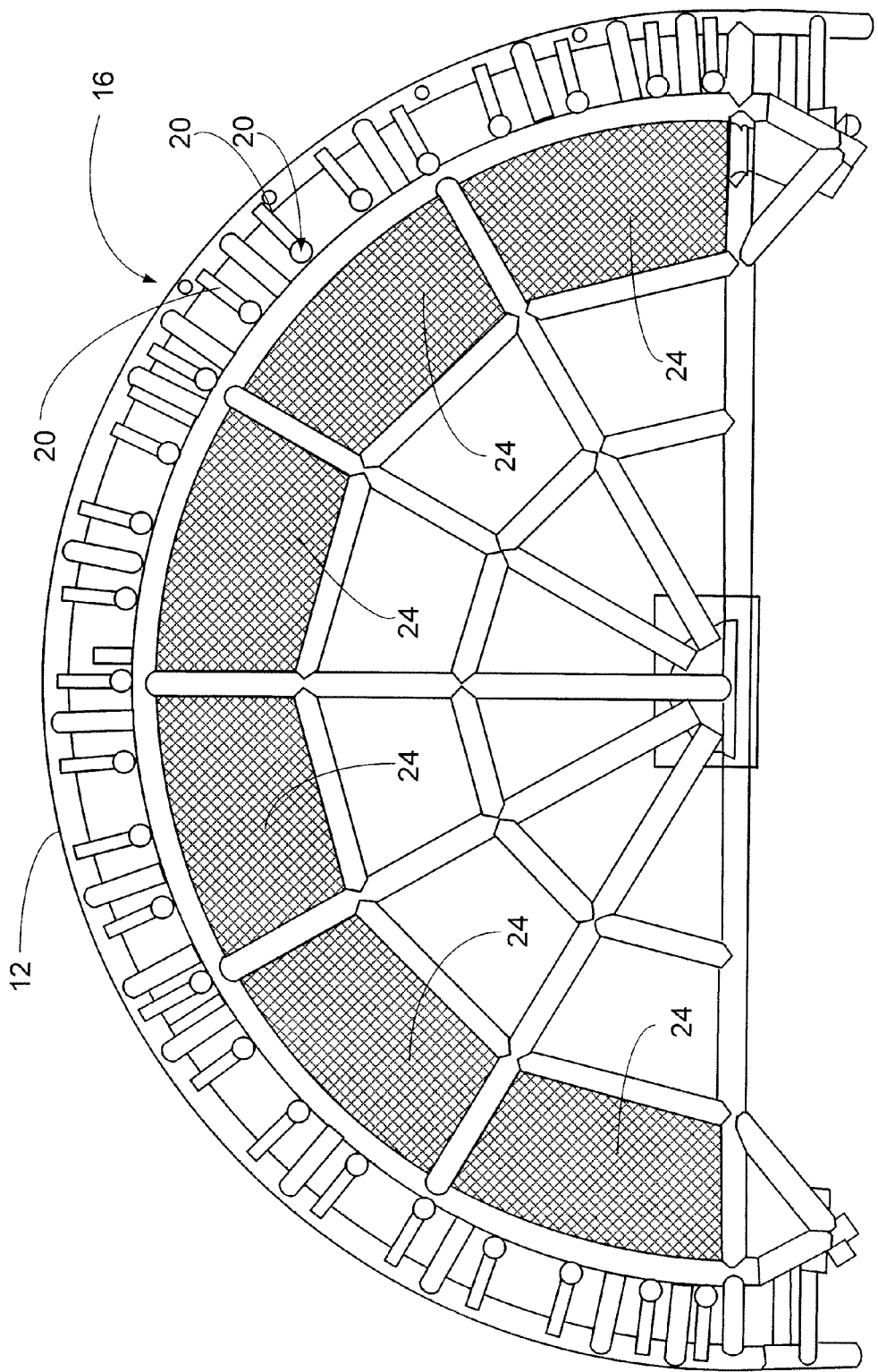
FIG. 6 is an enlarged view of the roller quadrant.

As best seen in FIG. 6, when used, the buoyancy modules 24 are attached within the framework of the roller quadrant 16. The number and spacing of the buoyancy modules 24 may be selected to adjust the buoyancy and trim of the roller quadrant 16 as desired and required. The buoyancy modules 24 may be any suitable material such as hard buoyancy tanks or syntactic foam, both of which are known in the offshore industry.

In operation, the cable 12 is laid offshore by a larger cable lay vessel (CLV) not shown until the larger vessel reaches the shallowest water in which it can operate. The cable lay barge 10 is aligned with the latest cable lay vessel and cable is paid out from the larger vessel and reeled onto the carousel 14 on the barge 10. The barge 10 is then used to lay cable 12 onto the floor of the body of water until the barge 10 reaches the shallowest water in which it can operate.

The above procedures are known in the industry of laying cable in bodies of water but are presented for clarity in presenting the cable laying operation as a whole. The following process involves the method of the invention which differs from, and is the improvement upon, the prior art process for laying cable to shore from this point.

Figure 3:
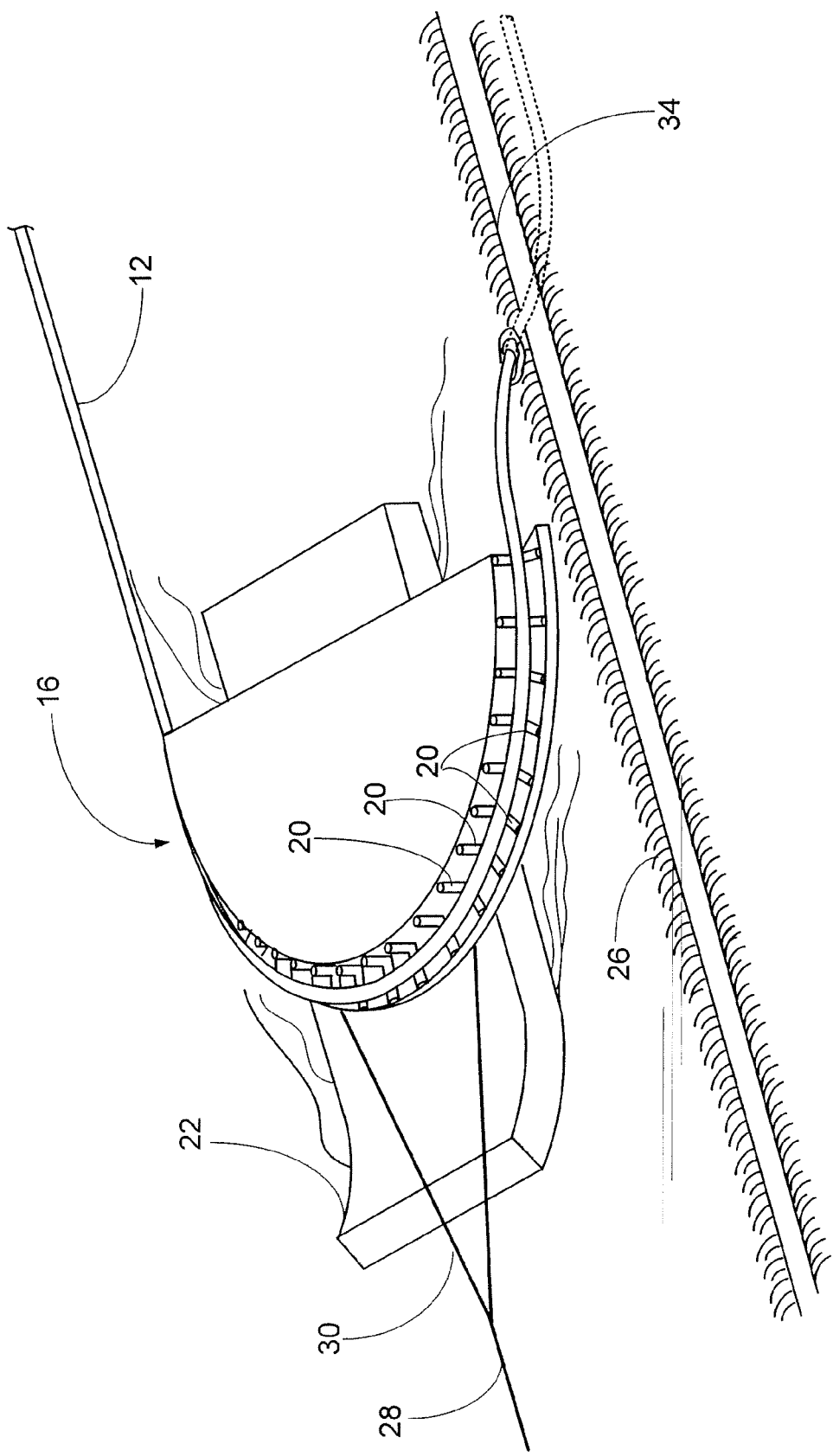
FIG. 3 is the enlarged view of the area indicated in FIG. 2.
Figure 4:
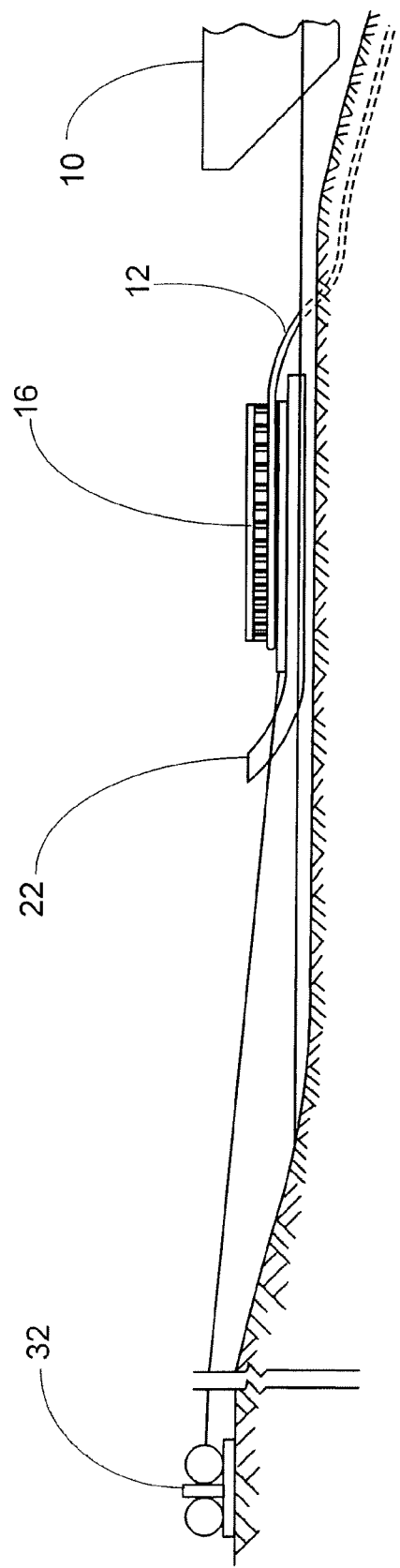
FIGS. 4 and 5 are elevation views of the cable laying.
Figure 5:
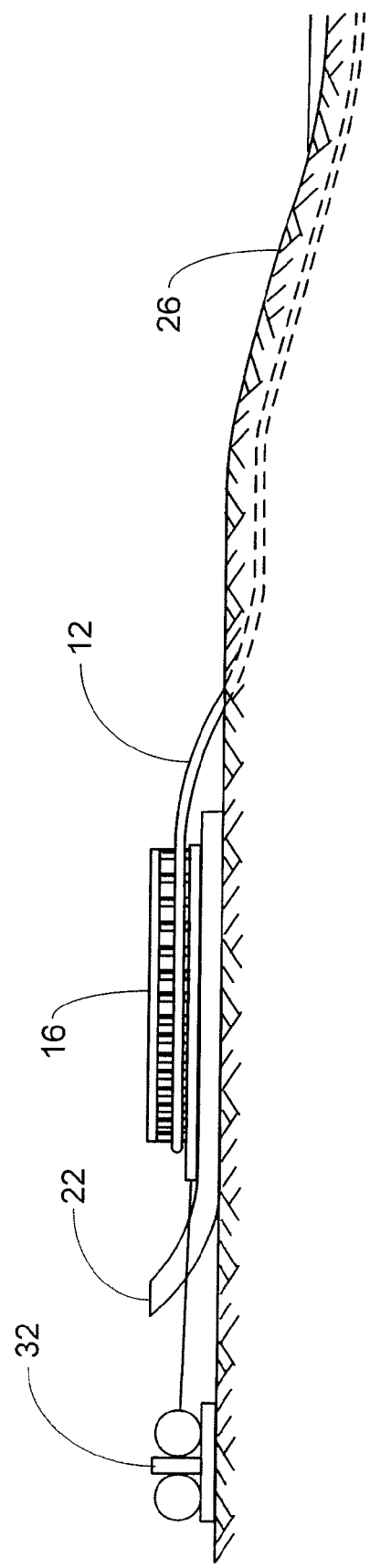

At this point, the roller quadrant 16, with cable 12 placed around it, is placed in the water (as seen in FIG. 2) by use of a crane 18 on the barge 10 or on a different vessel alongside the barge 10. As seen in FIG. 3-5, a line 28 and towing bridle 30 are attached to the roller quadrant 16 and a towing device 30. The towing device 30 is represented schematically in FIGS. 5 and 6 and may be a bulldozer capable of being used in shallow water and/or a winch on shore. The towing device used will depend on the distance, soil conditions, and water conditions.

The cable 12 is preferably directed into a pre-cut trench 34 for ease of burying the cable 12 for protection purposes.

During the movement of the roller quadrant 16 the cable 12 is paid out from the carousel 14 on the barge such that the cable moves around the roller quadrant 16 as it moves through the water. The movement of the cable 12 is indicated by the arrows in FIG. 2. The barge 10 includes an over boarding ramp 34 that is known in the industry to protect the cable as it is paid out.

The invention provides a number of advantages.

The invention enables the cable to be pulled in a controlled manner from the point at which the vessel with the cable can no longer proceed toward shore due to the shallow water depth.

The invention enables a greater degree of latitude in the selection of pulling equipment at the shore side when compared to the traditional methods which must rely on using a single winch and a single connection point on the cable end.

With the invention, the modified roller quadrant includes several pulling points to attach multiple winch wires if desired or needed.

While specific embodiments and/or details of the invention have been shown and described above to illustrate the application of the principles of the invention, it is understood that this invention may be embodied as more fully described in the claims, or as otherwise known by those skilled in the art (including any and all equivalents), without departing from such principles.

What is claimed as invention is:

1. A method for laying cable from a vessel at a near shore location to shore, comprising the steps:
   a. wrapping the cable on the vessel around a roller quadrant on the vessel;
   b. moving the roller quadrant and cable thereon from the vessel into the water;
   c. connecting a pull line from a pulling device to the roller quadrant; and
   d. pulling the roller quadrant and cable to shore.

2. The method of claim 1, wherein the roller quadrant includes a skid.

3. The method of claim 1, wherein the roller quadrant includes buoyancy means.

4. The method of claim 1, wherein the pull device is in the water.

5. The method of claim 1, wherein the pull device is on shore.

6. A method for laying cable from a vessel at a near shore location to shore, comprising the steps:
   a. wrapping the cable on the vessel around a roller quadrant on the vessel, the roller quadrant having a skid and buoyancy means;
   b. moving the roller quadrant and cable thereon from the vessel into the water;
   c. connecting a pull line from a pulling device to the roller quadrant; and
   d. pulling the roller quadrant and cable to shore.

7. The method of claim 6, wherein the pull device is in the water.

8. The method of claim 1, wherein the pull device is on shore.

* * * * *